United States Patent
Gregg et al.

(10) Patent No.: US 10,239,156 B2
(45) Date of Patent: Mar. 26, 2019

(54) MULTI-DENSITY, MULTI-PROPERTY TURBINE COMPONENT

(71) Applicant: United Technologies Corporation, Hartford, CT (US)

(72) Inventors: Shawn J. Gregg, Wethersfield, CT (US); Alexander Staroselsky, Avon, CT (US); Gajawalli V. Srinivasan, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 380 days.

(21) Appl. No.: 15/026,474

(22) PCT Filed: Sep. 25, 2014

(86) PCT No.: PCT/US2014/057358
§ 371 (c)(1),
(2) Date: Mar. 31, 2016

(87) PCT Pub. No.: WO2015/053946
PCT Pub. Date: Apr. 16, 2015

(65) Prior Publication Data
US 2016/0214211 A1    Jul. 28, 2016

Related U.S. Application Data

(60) Provisional application No. 61/888,749, filed on Oct. 9, 2013.

(51) Int. Cl.
*F01D 5/18* (2006.01)
*B23K 26/342* (2014.01)
(Continued)

(52) U.S. Cl.
CPC .......... *B23K 26/342* (2015.10); *B22F 3/1055* (2013.01); *B22F 3/11* (2013.01);
(Continued)

(58) Field of Classification Search
CPC ...... F01D 5/18; F01D 5/28; B22F 3/11; B22F 3/1055; B22F 5/04; B22F 2207/13;
(Continued)

(56) References Cited

U.S. PATENT DOCUMENTS 5,038,014 A * 8/1991 Pratt ..................... B22F 3/1055
219/121.64
2007/0003416 A1 1/2007 Bewlay et al.
(Continued)

FOREIGN PATENT DOCUMENTS

EP    1940575 A1    7/2008
EP    2620240 A1    7/2013

OTHER PUBLICATIONS

Extended European Search Report, for European Patent Application No. 14851677.6, dated Jun. 8, 2017, 9 pages.
(Continued)

*Primary Examiner* — Igor Kershteyn
(74) *Attorney, Agent, or Firm* — Kinney & Lange, P.A.

(57) ABSTRACT

A method of forming a metal component having different regions containing different grain sizes and in porosities is by additive manufacturing. The method includes spreading a layer of starting powder on a temperature controlled moveable platform in a heated chamber with atmosphere and temperature control. Selected areas of the powder are melted and solidified with a computer controlled focused energy beam. The cooled platform is then indexed down and the process repeated. The grain size of the melted and solidified region can be controlled by the cooling rate during solidification which, in turn is controlled by the temperature of the chamber and the temperature of the cooled moveable platform.

20 Claims, 2 Drawing Sheets

(51) Int. Cl.
  *B23K 26/00* (2014.01)
  *B23K 26/12* (2014.01)
  *B23K 26/144* (2014.01)
  *B22F 3/11* (2006.01)
  *B22F 3/105* (2006.01)
  *B22F 5/04* (2006.01)
  *B23K 103/02* (2006.01)
  *B23K 103/08* (2006.01)
  *B23K 103/14* (2006.01)
  *F01D 5/28* (2006.01)
  *B33Y 10/00* (2015.01)
  *B33Y 80/00* (2015.01)
(52) U.S. Cl.
  CPC ............ *B22F 5/04* (2013.01); *B23K 26/0006* (2013.01); *B23K 26/12* (2013.01); *B23K 26/144* (2015.10); *F01D 5/18* (2013.01); *B22F 2207/13* (2013.01); *B22F 2207/17* (2013.01); *B23K 2103/02* (2018.08); *B23K 2103/08* (2018.08); *B23K 2103/14* (2018.08); *B33Y 10/00* (2014.12); *B33Y 80/00* (2014.12); *F01D 5/28* (2013.01); *Y02P 10/295* (2015.11)
(58) Field of Classification Search
  CPC . B22F 2207/17; B23K 26/0006; B23K 26/12; B23K 26/144; B23K 26/342; B23K 2203/02; B23K 2203/08; B23K 2203/14; B33Y 10/00; B33Y 80/00; Y02P 10/295
  See application file for complete search history.

(56) References Cited

U.S. PATENT DOCUMENTS

| | | | |
|---|---|---|---|
| 2009/0176007 A1* | 7/2009 | Uckelmann | A61C 13/0018 427/8 |
| 2011/0106290 A1* | 5/2011 | Hovel | B22F 3/1055 700/120 |
| 2012/0003086 A1 | 1/2012 | Morris et al. | |
| 2013/0071562 A1 | 3/2013 | Szuromi et al. | |
| 2013/0108460 A1 | 5/2013 | Szwedowicz et al. | |
| 2013/0195671 A1* | 8/2013 | El-Wardany | F01D 5/286 416/229 R |
| 2013/0195673 A1 | 8/2013 | Godfrey et al. | |

OTHER PUBLICATIONS

International Preliminary Report on Patentability dated Apr. 12, 2016, for corresponding PCT Application No. PCT/US2014/057358.
International Search Report and Written Opinion, for PCT Application No. PCT/US2014/057358, dated Jan. 16, 2015, 11 pages.

* cited by examiner

MULTI-DENSITY, MULTI-PROPERTY TURBINE COMPONENT

BACKGROUND

The invention relates generally to microstructure control in turbine components. In particular, the invention relates to turbine components with different grain sizes and porosities in different regions of the same component.

Different regions of metal alloy gaspath turbine components such as blades and vanes are subjected to widely different thermal mechanical stresses and loading conditions during operation. Airfoils, as an example, are exposed to high temperature centrifugal loading and require high temperature creep resistance. Blade attachments to turbine disks such as fir trees or roots experience lower temperature high contact loading that require high cycle fatigue strength. High temperature creep resistance can be achieved in alloys with large grain sizes. High cycle fatigue strength can be achieved in alloys with fine grain sizes. Successful microstructural design of a single component exposed to these different loading conditions during operation using conventional manufacturing methods normally results in a compromise between at least two microstructures. Areal specific microstructure control in a single monolithic component using conventional manufacturing methods such as casting and forging is difficult.

SUMMARY

A metal component such as a turbine component formed by additive manufacturing includes a first region with a first grain size and porosity and a second region with a second grain size and porosity. The grain size and porosity of the second region are different than the grain size and porosity of the first region.

In an embodiment, a method of forming a metal component with different regions having different grain sizes and porosities by additive manufacturing starts with the preparation of a starting powder. The powder is then spread on a temperature controlled, cooled moveable platform in a heated chamber with atmospheric and temperature control. Selected areas of the powder layer are melted and solidified with a computer controlled focused energy beam according to a 3-D design of the component in a memory of the computer. Open channels may be formed in the solidified powder that act as connected porosity. The cooled temperature controlled moveable platform is then indexed down one layer of thickness and another layer of powder is spread on the melted and solidified layer on the platform and the process of melting and solidifying selected areas of the powder layer is repeated. The process is repeated until the component is formed.

In an embodiment, the grain size of the melted and solidified regions is controlled by the cooling rate during solidification which depends on the temperature and temperature gradient of the layer. Which in turn depend on the temperature of the chamber and the temperature of the cooled moveable platform.

DETAILED DESCRIPTION

The invention is a metal component with controlled varying microstructural variations throughout the body of the component.

The microstructural variations include grain size variations and density variations. In particular, porosity variations. While the invention is not limited to any metal component, the component may be a turbine component. In an embodiment, the invention may be a gaspath turbine component such as a blade or vane. In an example, the component may be a blade.

Figure 1:
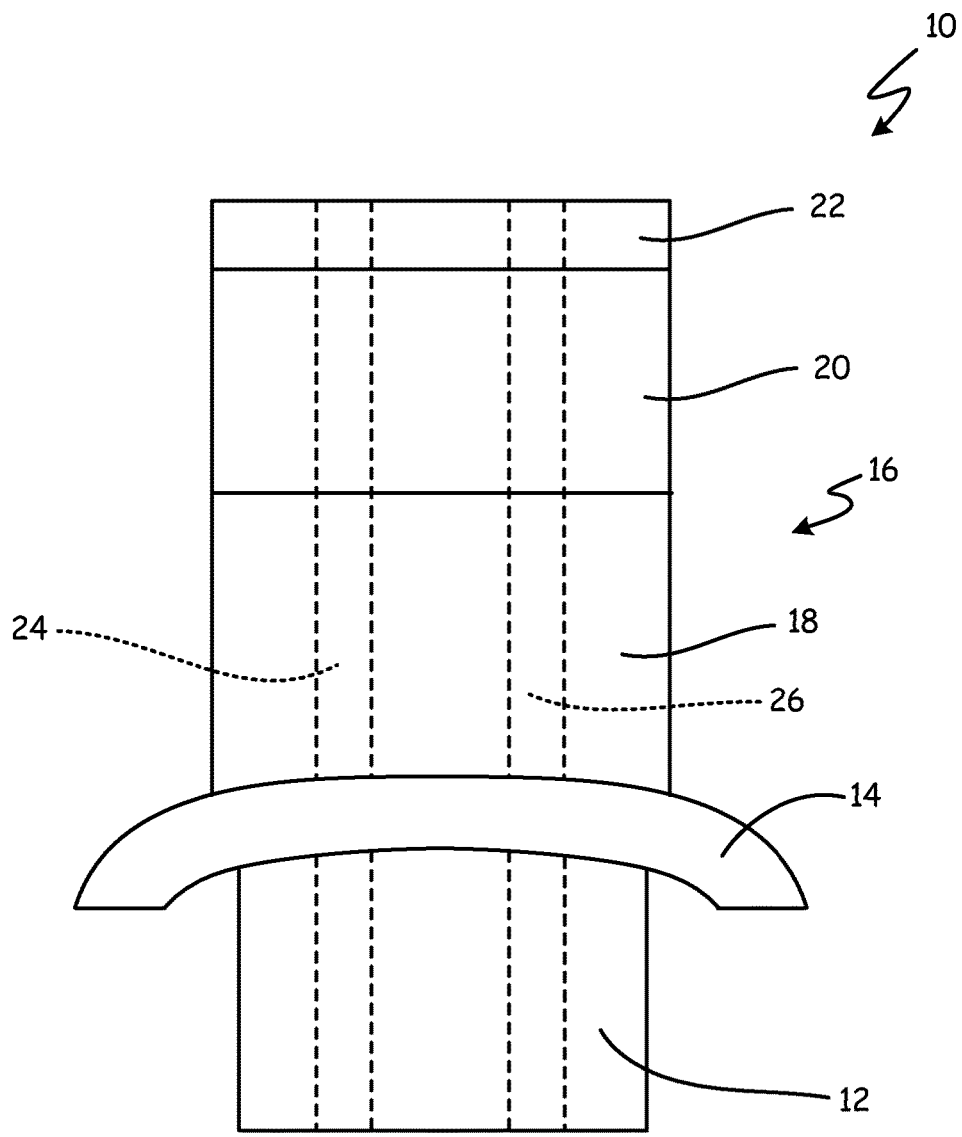
FIG. 1 is a schematic representation of a turbine blade.

A schematic representation of a turbine blade of the invention is shown in FIG. 1. Turbine blade 10 comprises root 12, platform 14 airfoil 16 and internal cooling passages 24 and 26. Airfoil 16 comprises three sections 18, 20, and 22. Each section of turbine blade 10 may have a different microstructure and resulting different physical properties such as mechanical strength, fatigue resistance, creep strength, density and other properties known in the art. Cooling passages 26 and 28 distribute bypass engine air to affect cooling of turbine blade 10 during operation.

As an example, root 12 may be dense and have a fine grain microstructure. Root 12 may have a high tensile strength and high cycle fatigue limit. Platform 14 may be dense and have a larger grain size than root 12 and may have an intermediate strength level. Lower airfoil section 18 may be dense and have a larger grain size than platform 14. The larger grain size of lower airfoil 18 may have high creep resistance resulting from the larger grain size. Mid-span airfoil section 20 may have a large grain size and resulting high creep resistance and may have a lower density to lower centrifugal loading on lower airfoil section 18 during operation. Lower density is accomplished by increased porosity of mid-span airfoil section 20. Outer span section 22 of airfoil 16 may be less dense than mid-span 20 to further decrease centrifugal loading on airfoil 16 during operation. This may be accomplished by further increasing the porosity of outer span airfoil section 22. Grain size and density variations of the inventive component shown in FIG. 1 can be abrupt or gradual wherein the grain size or porosity can continuously or intermittently change throughout a component as discussed in the next section wherein the inventive method of forming a component with varying grain size and/or porosity is described.

The approach of the invention can be used on other turbine components known in the art. In particular, the approach can be used for fine grain dense structures for fatigue limited areas of blades, such as hooks and rails.

Metal components of the invention may be formed from, but not limited to, superalloys, preferably nickel-base, cobalt-base, iron-base, and mixtures thereof and titanium alloys.

The components of the invention containing internal property and microstructure variations throughout the body of the component can be formed using additive manufacturing. Additive manufacturing is a process wherein three-dimensional (3-D) objects are produced with a layer-by-layer technique directly from a digital model. The additive manufacturing process is in distinct contrast to conventional subtractive methods of manufacturing wherein metal is removed in a piece-by-piece fashion from a part by machining, grinding, etc. or by other forming methods such as forging, casting, injection molding, etc.

In additive manufacturing, a piece is formed by the deposition of successive layers of material with each layer adhering to the previous layer until the build is completed.

A single layer may be formed by sintering, fusing or otherwise solidifying specific areas of the top layer of a powder bed by a computer controlled beam of energy or by depositing individual liquid or semi-liquid drops on specific areas of a workpiece by a computer controlled deposition apparatus. Common energy sources are laser and electron beams.

Additive manufacturing technology was originally used to form polymer models for design and prototyping. Current additive manufacturing processing now produces product from polymers, metal, metal/polymer composites and ceramics. In addition to preproduction designs and models, current efforts now include direct additive manufacturing fabrication of production parts for obvious reasons. The direct freeform fabrication of a superalloy turbine component such as an airfoil with internal cooling passages, for example, can eliminate a number of costly manufacturing operations.

Figure 2:
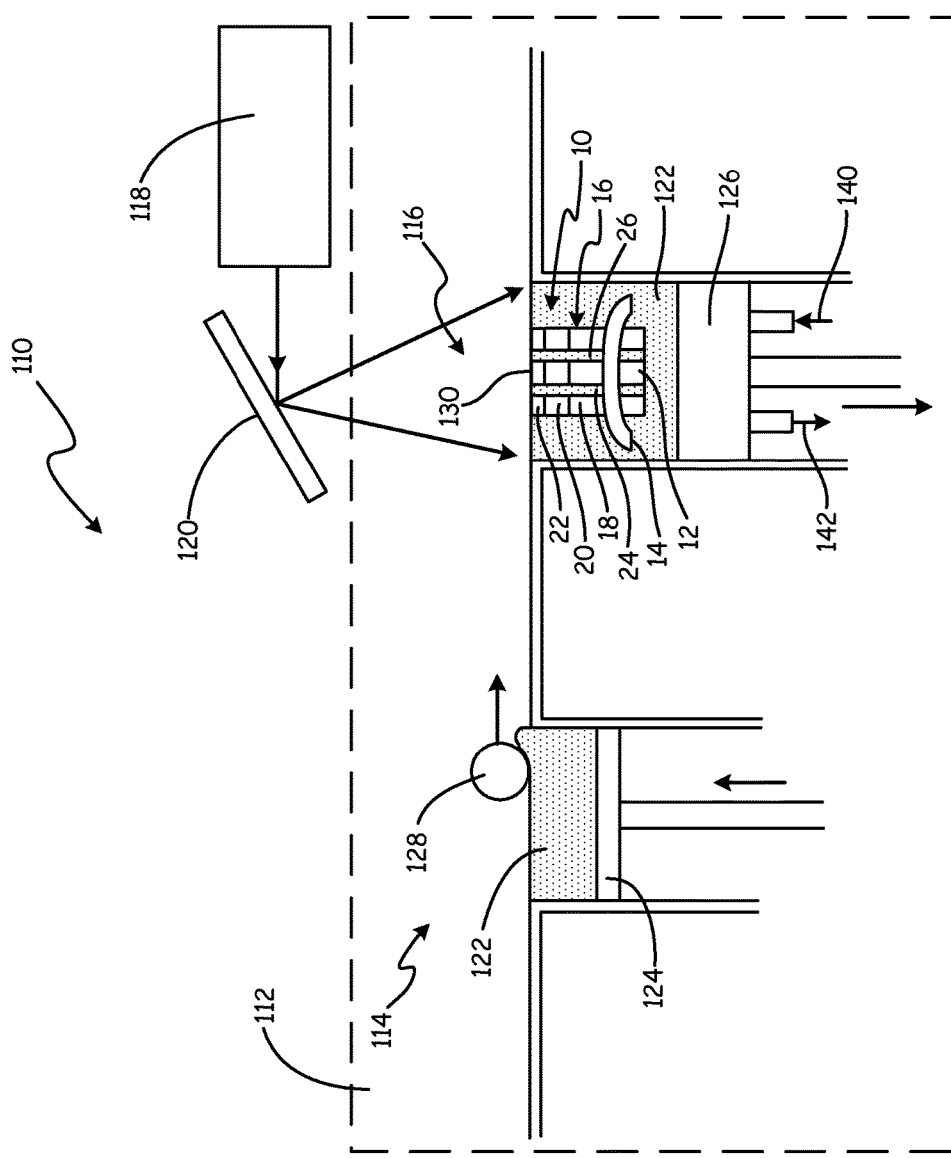
FIG. 2 is a schematic representation of an additive manufacturing process of the invention.

Powder based additive manufacturing processes applicable to the present invention include laser additive manufacturing (LAM), selective laser melting (SLM), direct laser melting (DLM), electron beam melting (EBM), direct metal deposition (DMD), and others known in the art. An example of a powder based additive manufacturing process of the invention is shown in FIG. 2. Process 110 includes manufacturing chamber 112 containing devices that produce solid components by additive manufacturing. An example of process 110 is laser additive manufacturing (LAM). LAM process 110 comprises powder storage chamber 114, build chamber 116, laser 118, scanning mirror 120 and powder removal system 200. During operation of LAM process 110, powder 122 is fed upward by piston 124 and is spread over build platform 126 by roller 128. After powder 122 is spread in an even layer on build platform 126, laser 118 and scanning mirror 120 are activated to direct a laser beam over build platform 126 to melt selected areas of powder 122 to form a single solidified layer 130 of component 10, in this case turbine blade 10 from FIG. 1 and to attach the solidified areas to underlying platform 126 according to a 3-D computer model of component 10 stored in a memory file and process 110.

In the next step, roller 128 is returned to a starting position, piston 124 advances to expose another layer of powder 122 and build platform 126 indexes down by one layer of thickness. Roller 128 then spreads a layer of powder 122 over the surface of build platform 126 containing selectively solidified areas. Laser 118 and scanning mirror 120 are activated and selective areas of the deposited layer of powder are again melted and joined to the underlying layer according to the cross-section of the digital model of the component stored in the memory of process 110. Internal cooling passages 24 and 26 are filled with powder 122. The process is repeated until solid component 10 is completed.

After the build, the powder in cooling passages 24 and 26 is removed through openings in the bottom of blade 10.

Porosity may be introduced in a powder layer by melting and solidifying selective linear regions to create channels in the layer. The channels act as interconnected porosity to decrease the density of the layer. Pulse laser characteristics (pulse period, pulse width, pulse shape) as well as powder preheating and increased scanning speed may contribute to formation of smaller melting pool size and subsequently in producing small "porous" structure. Decrease in the particle size smaller than 1 micron and beam diameter of 5 microns or smaller will allow production of the channels with the average size less than 5 microns.

As mentioned, process 110 is only an example of a solid freeform manufacturing process and is not meant to limit the invention to any single process known in the art.

As mentioned, component 10 in this example may be example turbine blade 10 of FIG. 1 wherein the component parts of turbine blade 10 are marked accordingly as root 12, platform 14, airfoil 16, lower airfoil section 18, midspan airfoil section 20, outer airfoil span 22 and cooling channels 24 and 26.

A key feature of the invention is cooled temperature controlled platform 126. The temperature of cooled temperature controlled platform 126 is controlled by liquid coolant flowing through platform 126 through inlet and outlet ports 140 and 142. A preferred coolant is water.

The grain size of solidified layer 130 is controlled by the thermal conditions existing when molten regions of layer 130 solidify. The temperature of chamber 114 can be controlled from ambient to 900° F. A higher temperature in chamber 112 during melting layer 130 will slow the solidification rate and lead to larger grain sizes in the solidified layer. Heat extracted from layer 130 by cooled temperature controlled platform 126 will create a temperature gradient across solidifying layer 130 and affect the cooling rate. The more heat extracted by chilled base 126 will increase the cooling rate and lead to finer grain sizes in layer 130. It is known in the art that nucleation rate during solidification of a melt is proportional to both the cooling rate and the degree of undercool.

As noted above, porosity is introduced into a layer, for instance, by forming linear channels in the layer by melting and solidifying specific regions of the layer during the build. Density variation can be also achieved by the variation of the powder metal material from one additive manufacturing layer to the successive one. Appropriate composition variation of the metal powder will allow the corresponding variation of the part local density.

Discussion of Possible Embodiments

The following are non-exclusive descriptions of possible embodiments of the present invention.

A metal component formed by additive manufacturing may include: a first region with a first grain size and first porosity; and a second region with a second grain size and second porosity that are different from the first grain size and first porosity.

The metal component of the preceding paragraph can optionally include, additionally and/or alternatively any, one or more of the following features, configurations and/or additional components.

The grain size of a first region at a first position on the component transitions from a first grain size to a second grain size at a second position on the component over a distance thereby creating a grain size gradient in the component.

The porosity of a first region at a first position on the component transitions from the first porosity to a second porosity at a second position on the component over a distance thereby creating a porosity gradient in the component.

The density of a first region at a first position on the component transitions from a first density to a second a density at a second position on the component over a distance and thereby creating a density gradient in the component.

The composition of a first position on the component transitions from a first composition to a second composition at a second position on the component over a distance thereby creating a composition gradient in the components.

The metal may be selected from the group consisting of a nickel-based, cobalt-based, iron-base superalloy or mixtures thereof and a titanium alloy.

The component may be a turbine component.

The component may be a blade or vane.

The first region may be a blade root and the second region an airfoil.

The first region may require a small grain size, high density and low porosity to have the mechanical strength to resist low cycle fatigue.

A region may require a large grain size, low density and high porosity to resist creep under centrifugal loading.

A method of forming a metal component with different regions having different grain sizes and porosities by additive manufacturing may include: preparing a starting powder; spreading a layer of powder on a temperature controlled, cooled moveable platform in a heated chamber with atmosphere and temperature control; melting and solidifying selective areas of the powder layer with a computer controlled focused energy beam according to a 3-D design of the component in the memory of a computer;

forming open channels in the solidified powder layer that may act as interconnected porosity; indexing the temperature controlled platform down one layer of thickness; spreading another layer of powder on the melted and solidified layers; melting and solidifying selective areas of the powder layer with a computer controlled focused energy beam according to a 3-D design of the component in the memory of the computer; forming open channels in the solidified powder layer that may act as interconnected porosities; and repeating the process until the component is formed.

The method of the preceding paragraph can optionally include, additionally and/or alternatively any, one or more of the following features, configurations and/or additional components;

The directed energy beam may be a laser.

The powder may be selected from the group consisting of nickel-based, cobalt-based, iron based superalloy or mixtures thereof and a titanium alloy.

The grain size of the solidified regions may be controlled by the solidification rate of the molten regions which is determined by the temperature gradient across the molten regions following passage of the energy beam.

The temperature gradient across the molten regions may be determined by the temperature of the heated chamber and the temperature of the cooled moveable platform.

The component may be a turbine component.

The component may be a blade or vane.

Regions requiring high strength may have small grain size, high density and low porosity.

Regions requiring high strength to resist creep under centrifugal loading may have large grain size low density and high porosity.

Although the present invention has been described with reference to preferred embodiments, workers skilled in the art will recognize that changes may be made in form and detail without departing from the spirit and scope of the invention.

The invention claimed is:

1. A metal component formed by additive manufacturing, the component comprising:
a first region with a first grain size and first porosity; and
a second region with a second grain size and second porosity that are different than the first grain size and first porosity.

2. The component of claim 1 wherein the grain size of the first region at a first position on the component transitions from the first grain size to a second grain size at a second position on the component over a distance thereby creating a grain size gradient in the component.

3. The component of claim 1 wherein the porosity of the first region at a first position on the component transitions from the first porosity to a second porosity at a second position on the component over a distance thereby creating a porosity gradient in the component.

4. The component of claim 1 wherein the density of the first region of a first position on the component transitions from the first density to a second density of a second position on the component over a distance thereby creating a density gradient in the component.

5. The component of claim 1 where in the composition of the first region at a first position on the component transitions from the first composition to a second composition of a second position on the component over a distance thereby creating a composition gradient in the component.

6. The component of claim 1 wherein the metal selected from the group consisting of a nickel base, cobalt base, iron base superalloy or mixtures thereof, and a titanium alloy.

7. The component of claim 1 wherein the component is a turbine component.

8. The component of claim 7 wherein the component is a blade or vane.

9. The component of claim 8 wherein the first region is a blade root and the second region is an airfoil.

10. The component of claim 9 wherein the first region requires a small grain size, high density and low porosity to have the mechanical strength to resist low cycle fatigue.

11. The component of claim 9 wherein the second region requires a large grain size, low density and high porosity to resist creep under centrifugal loading.

12. A method of forming a metal component with different regions having different grain sizes and porosities by additive manufacturing comprising:
preparing starting powder;
spreading a layer of powder on a temperature controlled, cooled moveable platform in a heated chamber with atmosphere and temperature control;
melting and solidifying selected areas of the powder layer with a computer controlled focused energy beam according to a 3-D design of the component in a memory of the computer;
forming open channels in the solidified powder layer that may act as interconnected porosity;
indexing the temperature controlled platform down one layer of thickness;
spreading another layer of powder on the melted and solidified layer;
melting and solidifying selected areas of the powder layer with the computer controlled focused energy beam according to the 3-D design of the component in the memory of the computer;
forming open channels in the solidified powder layer that may act as interconnected porosity; and
repeating the process until the component is formed.

13. The method of claim 12 wherein the directed energy beam is a laser.

14. The method of claim 12 wherein the powder is selected from the group consisting of a nickel base, cobalt base, iron base superalloy or mixtures thereof and a titanium alloy.

15. The method of claim 12 wherein the grain size of the solidified regions is controlled by the solidification rate of the molten regions which is determined by the temperature gradient across the molten regions following passage of the energy beam.

16. The method of claim 15 wherein the temperature gradient across the molten regions is determined by the temperature of the heated chamber and the temperature of the cooled moveable platform.

17. The method of claim 12 wherein the component is a turbine component.

18. The method of claim 17 wherein the component is a blade or vane.

19. The method of claim 18 wherein regions requiring high strength have small grain size, high density and low porosity.

20. The method of claim 18 wherein regions requiring high strength to resist creep under centrifugal loading have large grain size, low density and high porosity.

\* \* \* \* \*